(12) United States Patent
Lin et al.

(10) Patent No.: US 10,162,208 B2
(45) Date of Patent: Dec. 25, 2018

(54) TOUCH SENSING DISPLAY APPARATUS AND METHOD FOR FABRICATING SAME

(71) Applicant: AU Optronics Corporation, Hsin-Chu (TW)

(72) Inventors: Wei-Lin Lin, Hsin-Chu (TW); Yu-Feng Chien, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/378,250

(22) Filed: Dec. 14, 2016

(65) Prior Publication Data

US 2017/0276989 A1    Sep. 28, 2017

(30) Foreign Application Priority Data

Mar. 22, 2016   (TW) .............................. 105108854 A

(51) Int. Cl.
  *G02F 1/1333*   (2006.01)
  *G02F 1/1339*   (2006.01)
  (Continued)

(52) U.S. Cl.
  CPC ........ *G02F 1/13338* (2013.01); *G02F 1/1339* (2013.01); *G02F 1/13394* (2013.01); *G06F 3/0416* (2013.01); *G02F 1/1341* (2013.01); *G02F 1/1368* (2013.01); *G02F 1/133345* (2013.01); *G02F 1/133512* (2013.01); *G02F 1/133514* (2013.01); *G02F 1/134309* (2013.01); *G02F 2001/13398* (2013.01); *G06F 3/044* (2013.01); *G06F 3/0412* (2013.01);
  (Continued)

(58) Field of Classification Search
  CPC ............. G02F 1/13338; G02F 1/13394; G02F 1/133514; G02F 1/1368
  See application file for complete search history.

(56) References Cited

U.S. PATENT DOCUMENTS 6,501,529 B1    12/2002  Kurihara et al.
2007/0262967 A1 *  11/2007  Rho .................... G02F 1/13338
                                                                345/173

(Continued)

FOREIGN PATENT DOCUMENTS

CN            104793387 A         7/2015

*Primary Examiner* — Dung Nguyen
(74) *Attorney, Agent, or Firm* — WPAT, PC

(57) ABSTRACT

A touch sensing display apparatus includes a color filter substrate, a first touch sensing layer, an insulating layer, a second touch sensing layer, a plurality of photo spacers, a thin film transistor (TFT) substrate, and a liquid crystal layer. The color filter substrate includes a light-blocking layer. The first touch sensing layer is disposed on the light-blocking layer. The insulating layer is disposed on a side of the color filter substrate disposing with the first touch sensing layer. The first touch sensing layer is located between the insulating layer and the light-blocking layer. The second touch sensing layer is disposed on a side of the insulating layer away from the first touch sensing layer. The plurality of photo spacers is disposed on the side of the insulating layer away from the first touch sensing layer, and covers the second touch sensing layer. The TFT substrate is disposed on a side of the photo spacers away from the insulating layer. The liquid crystal layer is disposed between the insulating layer and the TFT substrate.

14 Claims, 14 Drawing Sheets

(51) Int. Cl.
  *G06F 3/041* (2006.01)
  *G02F 1/1335* (2006.01)
  *G02F 1/1341* (2006.01)
  *G02F 1/1343* (2006.01)
  *G02F 1/1368* (2006.01)
  *G06F 3/044* (2006.01)

(52) U.S. Cl.
  CPC .............. *G06F 2203/04103* (2013.01); *G06F 2203/04107* (2013.01)

(56) References Cited

U.S. PATENT DOCUMENTS

| | | |
|---|---|---|
| 2011/0073862 A1 | 3/2011 | Chen et al. |
| 2012/0212701 A1* | 8/2012 | Hwang ................ G02F 1/13394 349/155 |
| 2014/0063365 A1* | 3/2014 | Li ........................ G02F 1/13394 349/12 |
| 2014/0168541 A1* | 6/2014 | Zhao ................... G02F 1/13338 349/12 |
| 2015/0011054 A1 | 1/2015 | Chen et al. |
| 2015/0277186 A1 | 10/2015 | Zou |
| 2017/0082887 A1* | 3/2017 | Kubota ................. G06F 3/0416 |

* cited by examiner

TOUCH SENSING DISPLAY APPARATUS AND METHOD FOR FABRICATING SAME

BACKGROUND

Technical Field

The present invention relates to a touch sensing display apparatus, and more particularly to an in-cell projection capacitive touch sensing display apparatus.

Related Art

Generally, in a common liquid crystal touch sensing display apparatus formed of a touch sensing module and a liquid crystal module, for different objectives such as sensing and display, an electric signal needs to be transmitted through a circuit, so as to control the touch sensing module and the liquid crystal module. However, electric signals transmitted through circuits interfere with each other easily between touch sensing layers or at a boundary between a touch sensing layer and a liquid crystal layer. For example, a phenomenon such as cross-talk or electromagnetic interference occurs. Even, in a severe case of mutual interference, an electric field generated by a touch sensing layer affects rotation angles of liquid crystal in a liquid crystal display, and touch sensing layers contact each other to cause a short circuit phenomenon to occur, which separately affects the imaging of the liquid crystal module and the sensitivity of the touch sensing module. Therefore, to mitigate or avoid mutual interference between different electric signals or direct contact between circuits that affects electric signals transmitted through the circuits and results in that the liquid crystal module cannot implement normal imaging or the touch sensing module has reduced sensitivity, in a conventional liquid crystal touch sensing display apparatus, an insulating layer having a high dielectric coefficient is usually laid between touch sensing layers and an insulating layer having a low dielectric coefficient is usually laid between a touch sensing layer and a liquid crystal layer, to enable electric signals between layers in the liquid crystal touch sensing display apparatus to be transferred normally and enable normal operation.

Certainly, a stacking structure of a liquid crystal touch sensing display apparatus in which insulating layers are laid may protect normal transfer of electric signals between layers and prevent electrical connections. However, the thickness of a stacking structure of a liquid crystal touch sensing display apparatus gradually grows too large to meet the trend towards lightweight and thin apparatuses. As can be seen, in the existing architecture above, inconveniences and defects obviously still exist and further improvements are still to be made. To solve the foregoing problems, great effort has been devoted to a solution in the related field, but an applicable manner has not been developed over a long time. Therefore, how to effectively solve the foregoing problem is one of the important research and development topics at present, and also becomes a focus that requires improvement in the related field at present.

SUMMARY

A technical aspect of the present invention relates to a touch sensing display apparatus, in which a photo spacer is used to cover a touch sensing layer that is disposed on an insulating layer and near a surface of a liquid crystal layer, to isolate or insulate an electric field of the touch sensing layer from affecting the liquid crystal layer, so that liquid crystal molecules inside the liquid crystal layer may receive an electric signal of a TFT substrate without being subject to too much interference, to enable the touch sensing display apparatus to implement normal imaging, and at the same time reduce the thickness and weight of the touch sensing display apparatus. In this way, the influence on the liquid crystal layer in the touch sensing display apparatus from the electric field generated by the touch sensing layer can be reduced or avoided, and the touch sensing display apparatus further becomes lightweight and thin.

The present invention provides a touch sensing display apparatus, including a color filter substrate, a first touch sensing layer, an insulating layer, a second touch sensing layer, a plurality of photo spacers, a TFT substrate, and a liquid crystal layer. The color filter substrate includes a light-blocking layer. The first touch sensing layer is disposed on the light-blocking layer. The insulating layer is disposed on a side of the color filter substrate disposing with the first touch sensing layer. The first touch sensing layer is located between the insulating layer and the light-blocking layer. The second touch sensing layer is disposed on a side of the insulating layer away from the first touch sensing layer. The plurality of photo spacers is disposed on the side of the insulating layer away from the first touch sensing layer, and covers the second touch sensing layer. The TFT substrate is disposed on a side of the photo spacers away from the insulating layer. The liquid crystal layer is disposed between the insulating layer and the TFT substrate.

In one or more implementation manners of the present invention, the photo spacers cover the second touch sensing layer.

In one or more implementation manners of the present invention, the touch sensing display apparatus further includes at least one first conductive structure. The first conductive structure is disposed in the insulating layer. The second touch sensing layer is electrically connected to the first touch sensing layer through the first conductive structure.

In one or more implementation manners of the present invention, the touch sensing display apparatus includes a plurality of first conductive structures. The first touch sensing layer includes a plurality of drive electrodes and a plurality of sensing electrodes. The drive electrodes are respectively electrically connected to the second touch sensing layer through the corresponding first conductive structures.

In one or more implementation manners of the present invention, the touch sensing display apparatus includes a plurality of first conductive structures. The first touch sensing layer includes a plurality of drive electrodes and a plurality of sensing electrodes. The sensing electrodes are respectively electrically connected to the second touch sensing layer through the corresponding first conductive structures.

In one or more implementation manners of the present invention, the touch sensing display apparatus includes a plurality of first conductive structures. The second touch sensing layer includes a plurality of second conductive structures, respectively connected in a spaced manner between corresponding adjacent two of the first conductive structures.

In one or more implementation manners of the present invention, the liquid crystal layer is negative liquid crystal.

In one or more implementation manners of the present invention, the second touch sensing layer is located inside a perpendicular projection of the light-blocking layer in a stacking direction of the light-blocking layer and the insulating layer.

In one or more implementation manners of the present invention, the photo spacers are disposed in the liquid crystal layer, and the photo spacers are at least partially located inside a perpendicular projection of the light-blocking layer in a stacking direction of the light-blocking layer and the insulating layer.

In one or more implementation manners of the present invention, the touch sensing display apparatus further includes a sealant layer and at least one third conductive structure. The sealant layer and a third conductive structure are located between the insulating layer and the TFT substrate. The third conductive structure is disposed inside the sealant layer, and electrically connects the first touch sensing layer to a surface of the TFT substrate away from the liquid crystal layer.

In one or more implementation manners of the present invention, the third conductive structure electrically connects the second touch sensing layer and the first touch sensing layer.

The present invention provides a method for fabricating a touch sensing display apparatus, including: disposing a first touch sensing layer on a light-blocking layer of a color filter substrate; disposing an insulating layer on a side of the first touch sensing layer away from the light-blocking layer; disposing a second touch sensing layer on a side of the insulating layer away from the first touch sensing layer; disposing a photo spacer on a side of the insulating layer away from the light-blocking layer, the photo spacer covering the second touch sensing layer; and disposing a TFT substrate a side of the photo spacer away from the insulating layer.

In one or more implementation manners of the present invention, the method for fabricating a touch sensing display apparatus further includes injecting a liquid crystal layer between the insulating layer and the TFT substrate.

In one or more implementation manners of the present invention, the method for fabricating a touch sensing display apparatus further includes forming at least one first conductive structure in the insulating layer, the at least one first conductive structure being electrically connected to the first touch sensing layer and the second touch sensing layer, respectively.

In one or more implementation manners of the present invention, the step of disposing the second touch sensing layer includes enabling the second touch sensing layer to be located inside a perpendicular projection of the light-blocking layer in a stacking direction of the light-blocking layer and the insulating layer.

In one or more implementation manners of the present invention, the step of disposing the photo spacer includes enabling the photo spacer to be at least partially located inside a perpendicular projection of the light-blocking layer in a stacking direction of the light-blocking layer and the insulating layer.

BRIEF DESCRIPTION OF THE DRAWINGS

To make the foregoing and other objectives, features, and advantages of the present invention and the embodiments more comprehensible, the accompanying drawings are described as follows:

FIG. 2 to FIG. 8A are sectional side views of the touch sensing display apparatus in different stages of a method for fabricating a touch sensing display apparatus according to multiple implementation manners of the present invention;

Unless otherwise indicated, the same numerals and symbols in different drawings are generally used to represent corresponding parts. These drawings are used to clearly show correlations among these implementation manners rather than to show actual sizes.

DETAILED DESCRIPTION

A plurality of implementation manners of the present invention is disclosed below with reference to the accompanying drawings. For clear description, many details in practice will be described together in the following description. However, it should be understood that these details in practice should not be used to limit the present invention. That is, in some of the implementation manners of the present invention, these details in practice are not essential. In addition, to simplify the accompanying drawings, some conventional structures and elements are shown in a simple schematic manner in the accompanying drawings.

When one element is described to be "on" another element, it may generally refer to that the element is directly on the another element, or still another element may exist between the element and the another element. In contrast, when one element is described to be "directly on another element", no element should exist between the element and the another element. As used herein, the term "and/or" includes one or any combination of listed related items.

Herein, it may be understood that words such as first, second and third are used to describe various elements, components, areas, layers and/or blocks. However, these elements, components, areas, layers and/or blocks should not be limited by these terms. These words are only used for distinguishing between single elements, components, areas, layers and/or blocks. Therefore, a first element, component, area, layer and/or block hereinafter may also be referred to as a second element, component, area, layer and/or block without departing from the concept of the present invention.

Figure 1:
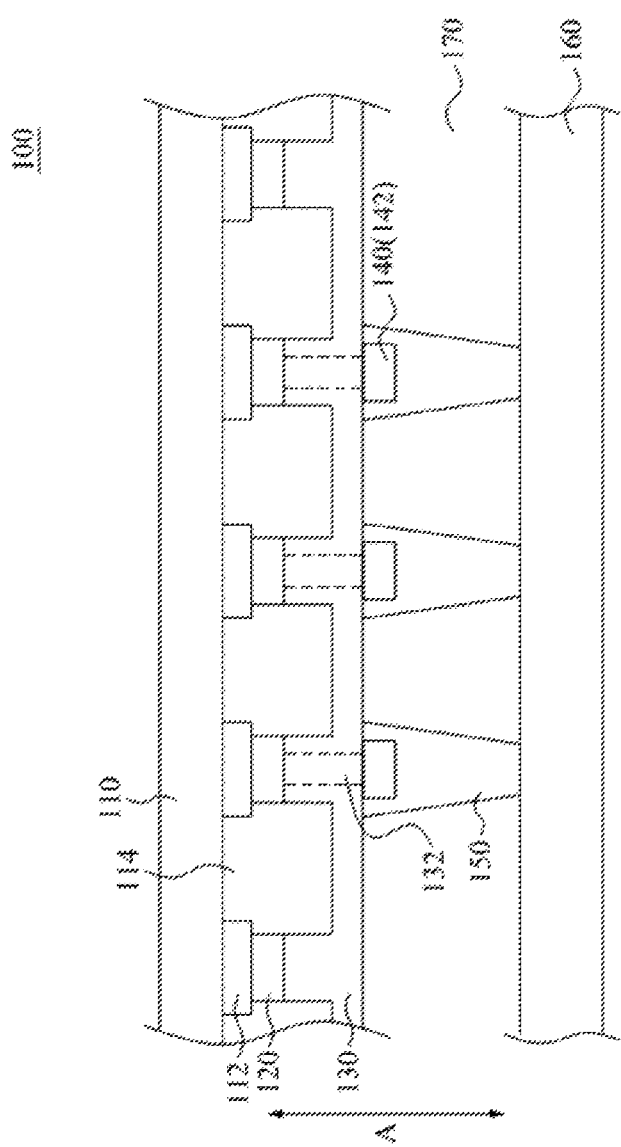
FIG. 1 is a sectional side view of a touch sensing display apparatus according to multiple implementation manners of the present invention.

FIG. 1 is a sectional side view of a touch sensing display apparatus 100 according to multiple implementation manners of the present invention. As shown in FIG. 1, the touch sensing display apparatus 100 includes a color filter substrate 110, a first touch sensing layer 120, an insulating layer 130, a second touch sensing layer 140, a plurality of photo spacers 150, a TFT substrate 160, and a liquid crystal layer 170. In multiple implementation manners, the color filter substrate 110 may include a light-blocking layer 112 and a color filter 114. In multiple implementation manners, the light-blocking layer 112 may be a black matrix (BM). In multiple implementation manners, the light-blocking layer 112 may have a plurality of apertures, and the color filter 114 is disposed between the apertures. In multiple implementation manners, first touch sensing layers 120 are disposed on the light-blocking layer 112. In multiple implementation manners, the first touch sensing layer 120 is disposed between the color filters 114. That is, the first touch sensing layer 120 may be located inside a perpendicular projection of the light-blocking layer 112 in a stacking direction A of the light-blocking layer 112 and the insulating layer 130, to maintain an aperture ratio of the color filter substrate 110. In multiple implementation manners, the material of the first touch sensing layer 120 may be a metal layer; a transparent metal oxide material, for example, at least one of indium tin oxide (ITO), indium zinc oxide (IZO), aluminum zinc oxide (AZO), aluminum indium oxide (AIO), indium oxide (InO), and gallium oxide (GaO); another transparent conductive material, for example, carbon nanotubes, nanometer silver particles, a metal or an alloy whose thickness is less than 60 nanometers (nm), and an organic transparent conductive material; or another suitable material.

In multiple implementation manners, the insulating layer 130 is disposed on a side of the color filter substrate 110 disposing with the first touch sensing layer 120. The first touch sensing layer 120 is located between the insulating layer 130 and the light-blocking layer 112. The second touch sensing layer 140 is disposed on a side of the insulating layer 130 away from the first touch sensing layer 120. In multiple implementation manners, the plurality of photo spacers 150 is disposed on the side of the insulating layer 130 away from the first touch sensing layer 120, and covers the second touch sensing layer 140. The TFT substrate 160 is disposed on a side of the photo spacers 150 away from the insulating layer 130. The liquid crystal layer 170 is disposed between the insulating layer 130 and the TFT substrate 160. In addition, the side of the photo spacers 150 away from the insulating layer 130 is held against the TFT substrate 160. In other words, a side of the photo spacers 150 may also be held against an electrode pattern (not shown) of the TFT substrate 160.

It should be noted that, a manner in which the photo spacers 150 described herein cover the second touch sensing layer 140 is only exemplary, and is not used to limit the present invention. In multiple implementation manners, the photo spacers 150 and the insulating layer 130 may together cover the second touch sensing layer 140; however, the present invention is not limited thereto. It should be understood that, a person of ordinary skill in the art may make equivalent variations and modifications according to actual demands without departing from the spirit and scope of the present disclosure, as long as the photo spacers 150 and the insulating layer 130 can avoid contact or conduction between the second touch sensing layer 140 and the liquid crystal layer 170. Even, in some implementation manners, the insulating layer 130 may be used to avoid an electrical connection between a second touch sensing layer 140' and a first touch sensing layer 120' (referring to FIG. 12).

The photo spacers 150 of the touch sensing display apparatus 100 can support a space between the insulating layer 130 and the TFT substrate 160 for injection of the liquid crystal layer 170 to form a liquid crystal module and at the same time can insulate the second touch sensing layer 140 and the liquid crystal layer 170. Therefore, when the photo spacers 150 are used to cover the second touch sensing layer 140, the influence on liquid crystal in the liquid crystal layer 170 from an electric field generated by the second touch sensing layer 140 when an electric signal passes through the second touch sensing layer 140 may be mitigated or avoided. For example, an inclined angle of liquid crystal, the sensitivity of rotation, and the like are affected. Therefore, when an electric signal is transmitted between the first touch sensing layer 120 and the second touch sensing layer 140, the touch sensing display apparatus 100 may normally control the liquid crystal layer 170. Further, as compared with a conventional touch sensing display apparatus in which an insulating layer is used to separate the second touch sensing layer from the liquid crystal layer, for the touch sensing display apparatus 100, the insulating layer is omitted in the touch sensing display apparatus 100 and the photo spacers 150 are used in place to cover the second touch sensing layer 140, so as to insulate the second touch sensing layer 140 and the liquid crystal layer 170 and at the same time support a space in which the liquid crystal layer 170 can be injected. In this way, instead of that another insulating layer is disposed in the touch sensing display apparatus 100, the photo spacers 150 are used to cover the second touch sensing layer 140, so that the thickness and weight of the touch sensing display apparatus 100 can be reduced at the same time, and functions of touch sensing and image displaying of the touch sensing display apparatus 100 are maintained, thereby further making the touch sensing display apparatus 100 lightweight and thin.

In multiple implementation manners, the touch sensing display apparatus 100 may further include at least one first conductive structure 132. The first conductive structure 132 is disposed in the insulating layer 130, so that the second touch sensing layer 140 may be electrically connected to the first touch sensing layer 120 through the first conductive structure 132, to enable some of electric signals of the first touch sensing layer 120 to enter the second touch sensing layer 140 through the first conductive structure 132, or enable an electric signal that enters the second touch sensing layer 140 to enter the first touch sensing layer 120 through the first conductive structure 132. In multiple implementation manners, the first conductive structure 132 may be a via or another suitable conductive structure, but is not limited thereto.

In multiple implementation manners, the touch sensing display apparatus 100 may include a plurality of first conductive structures 132. The first touch sensing layer 120 may include a plurality of drive electrodes and a plurality of sensing electrodes. The drive electrodes may be respectively electrically connected to the second touch sensing layer 140 through the corresponding first conductive structures 132. That is, an electric signal that is transferred during sensing by a sensing electrode of the first touch sensing layer 120 is only transferred in the first touch sensing layer 120. An electric signal that is transferred during sensing by a drive electrode of the first touch sensing layer 120 needs to pass through a first conductive structure 132, leave the drive electrode of the first touch sensing layer 120 to enter the second touch sensing layer 140, then pass through another first conductive structure 132, and leave the second touch sensing layer 140 to return to another drive electrode of the first touch sensing layer 120. In this way, the first conductive structures 132 and the structure of the second touch sensing layer 140 are combined with the first touch sensing layer 120, so that the touch sensing display apparatus 100 can avoid contact between the drive electrodes and the sensing electrodes of the first touch sensing layer 120. Therefore, when a user touches the touch sensing display apparatus 100, the drive electrodes and the sensing electrodes of the first touch sensing layer 120 can send corresponding electric signals respectively, and the corresponding electric signals are separately transmitted from the drive electrodes and the sensing electrodes to a control module of the touch sensing display apparatus 100, to enable the touch sensing display apparatus 100 to sense a position of contact of the user.

In other multiple implementation manners, the first touch sensing layer 120 of the touch sensing display apparatus 100 may include a plurality of drive electrodes and a plurality of sensing electrodes, where the sensing electrodes may be electrically connected to the second touch sensing layer 140 respectively through the corresponding first conductive structures 132. That is, an electric signal that is transferred during sensing by a drive electrode of the first touch sensing layer 120 is only transferred in the first touch sensing layer 120. An electric signal that is transferred during sensing by a sensing electrode of the first touch sensing layer 120 needs to pass through a first conductive structure 132, leave the sensing electrode of the first touch sensing layer 120 to enter the second touch sensing layer 140, pass through another first conductive structure 132, and leave the second touch sensing layer 140 to return to another sensing electrode of the first touch sensing layer 120. In this way, the first conductive structures 132 and the structure of the second touch sensing layer 140 are combined with the first touch sensing layer 120, so that the touch sensing display apparatus 100 can avoid contact between the sensing electrodes and the drive electrodes of the first touch sensing layer 120. Therefore, when a user touches the touch sensing display apparatus 100, the sensing electrodes and the drive electrodes of the first touch sensing layer 120 can respectively send corresponding electric signals, and the corresponding electric signals are separately transmitted from the sensing electrodes and the drive electrodes to a control module of the touch sensing display apparatus 100, to enable the touch sensing display apparatus 100 to sense a position of contact of the user.

Figure 8A:
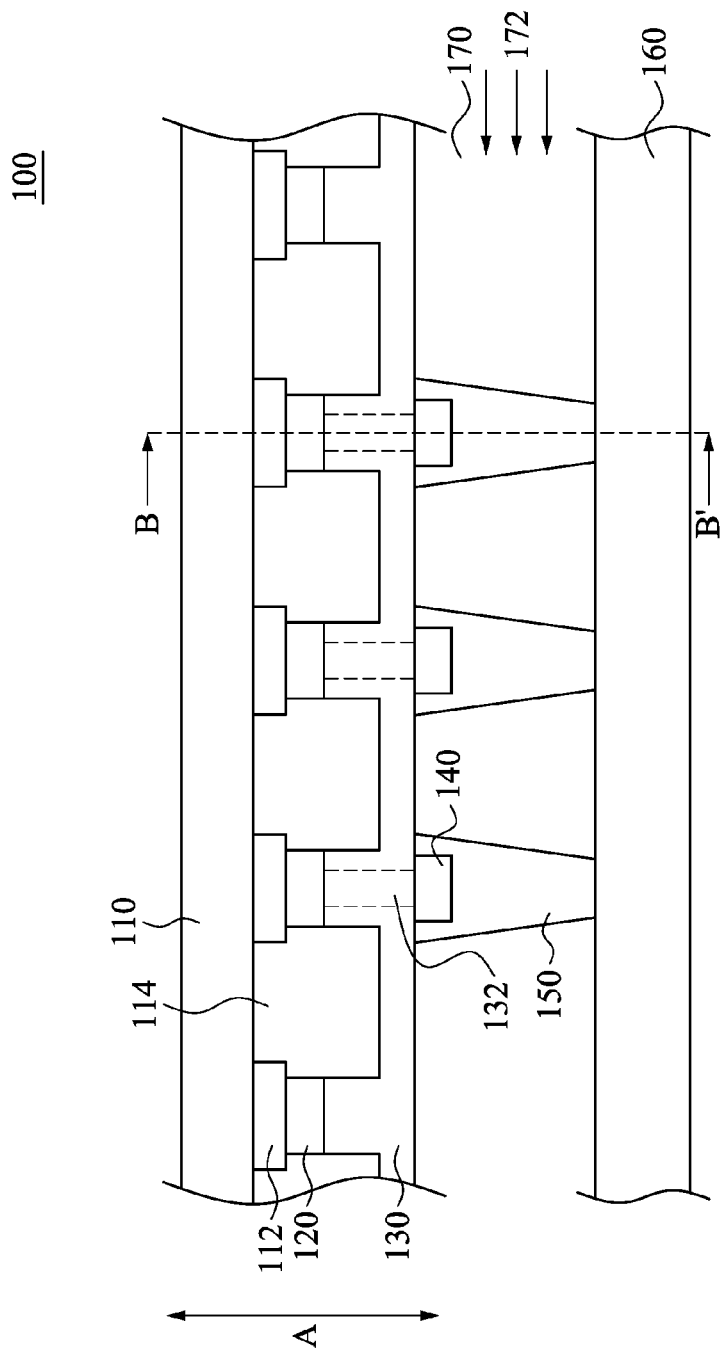
Figure 8B:
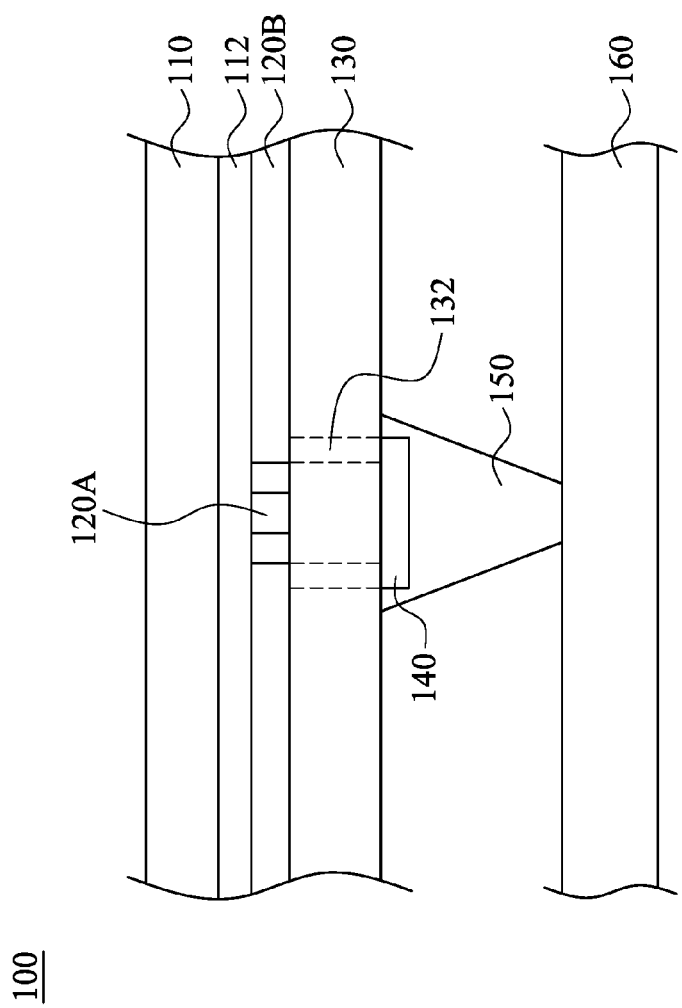
FIG. 8B is a sectional side view along a line segment B-B' in FIG. 8A.
Figure 13:
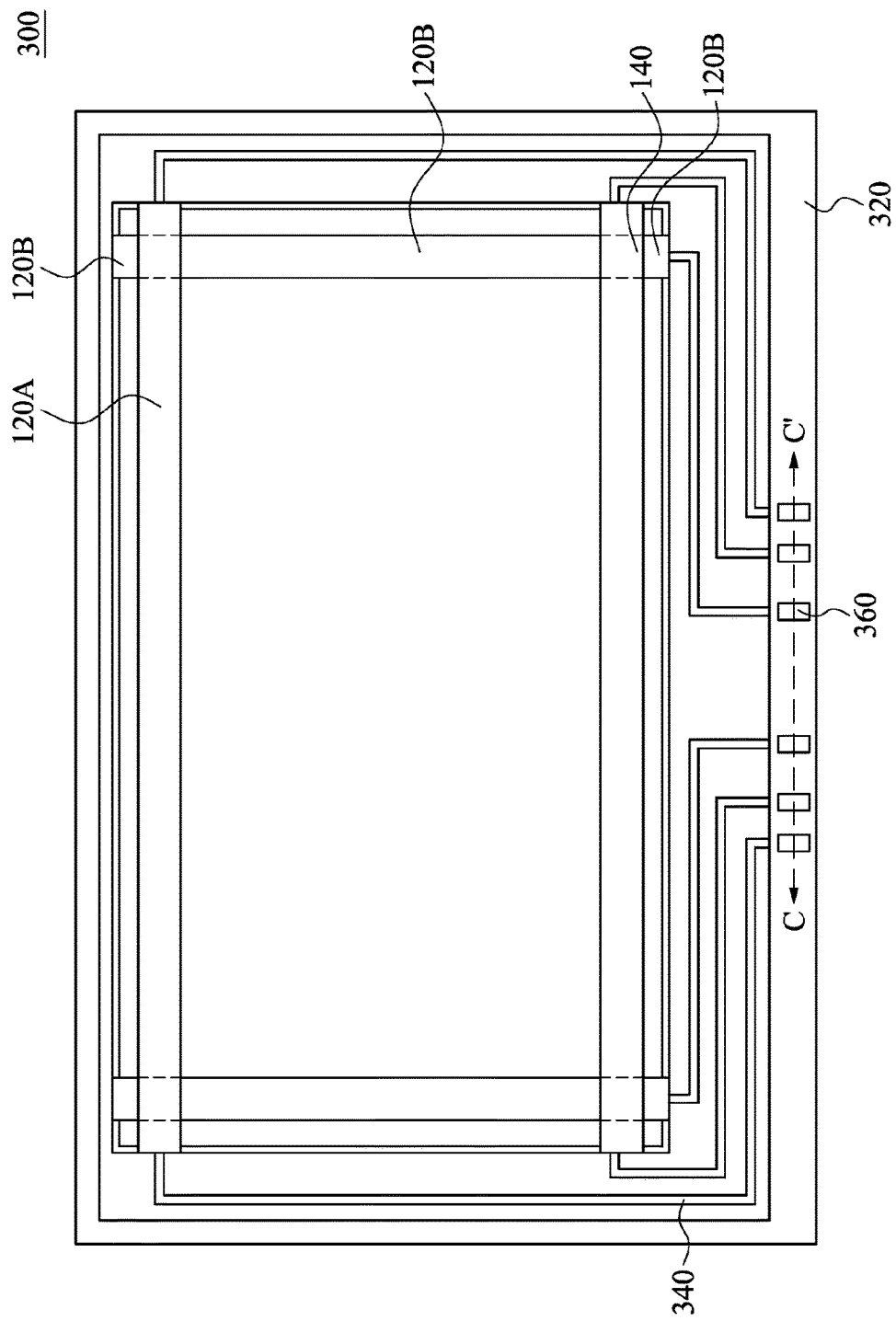
FIG. 13 is a perspective top view of a touch sensing display apparatus according to multiple implementation manners of the present invention.

In multiple implementation manners, the second touch sensing layer 140 may include a plurality of second conductive structures (referring to FIG. 8B and FIG. 13). In multiple implementation manners, the plurality of first conductive structures 132 in the insulating layer 130 is electrically connected to the plurality of second conductive structures of the second touch sensing layer 140. The second conductive structures are respectively connected in a spaced manner between corresponding adjacent two of the first conductive structures 132.

In multiple implementation manners, the liquid crystal layer 170 may be negative liquid crystal. That is, when an electric field is formed in the touch sensing display apparatus 100 by means of a voltage applied on the electrode pattern of the TFT substrate 160, liquid crystal molecules rotate in a direction perpendicular to the electric field. In this way, the electric field generated by the second touch sensing layer 140 does not easily affect the negative liquid crystal in the liquid crystal layer 170.

In multiple implementation manners, the second touch sensing layer 140 is located inside a perpendicular projection of the light-blocking layer 112 in a stacking direction A of the light-blocking layer 112 and the insulating layer 130. In multiple implementation manners, the second touch sensing layer 140 may be a metal layer; a transparent metal oxide material, for example, at least one of ITO, IZO, AZO, AIO, indium oxide, and GaO; another transparent conductive material, for example, carbon nanotubes, nanometer silver particles, a metal or an alloy whose thickness is less than 60 nanometers (nm), and an organic transparent conductive material; or another suitable material. Because the second touch sensing layer 140 is disposed inside the perpendicular projection of the light-blocking layer 112, even if an opaque material or a material that reflects most of the light is chosen to form the second touch sensing layer 140, as seen from the light-blocking layer 112 toward the TFT substrate 160, the second touch sensing layer 140 is shielded by the light-blocking layer 112, so that a visual effect of the touch sensing display apparatus 100 is not affected. In other words, the second touch sensing layer 140 that is only located inside the perpendicular projection of the light-blocking layer 112 may reduce or avoid a decrease in the aperture ratio or a transmittance of the color filter substrate 110 in the touch sensing display apparatus 100 that occurs because light that passes through the liquid crystal layer 170 is shielded or affected by the second touch sensing layer 140.

In multiple implementation manners, the photo spacers 150 are disposed in the liquid crystal layer 170, and the photo spacers 150 are at least partially located inside a perpendicular projection of the light-blocking layer 112 in a stacking direction A of the light-blocking layer 112 and the insulating layer 130. Because the photo spacers 150 are disposed inside the perpendicular projection of the light-blocking layer 112, even if the photo spacers 150 are mostly formed of an opaque material, as seen from the light-blocking layer 112 toward the TFT substrate 160, the photo spacers 150 are also shielded by the light-blocking layer 112, so that a visual effect of the touch sensing display apparatus 100 is not affected. In other words, the photo spacers 150 that are only located inside the perpendicular projection of the light-blocking layer 112 may reduce or avoid a decrease in the aperture ratio or a transmittance of the color filter substrate 110 in the touch sensing display apparatus 100 that occurs because light that passes through the liquid crystal layer 170 is shielded or affected by the photo spacers 150.

It should be noted that, the photo spacers 150 and the second touch sensing layer 140 described herein are only exemplary, and are not used to limit the present invention. It should be understood that, a person of ordinary skill in the art may make equivalent variations and modifications according to actual demands without departing from the spirit and scope of the present disclosure, as long as light can pass through the liquid crystal layer 170 and leave the color filter substrate 110 from the color filter 114.

Figure 2:
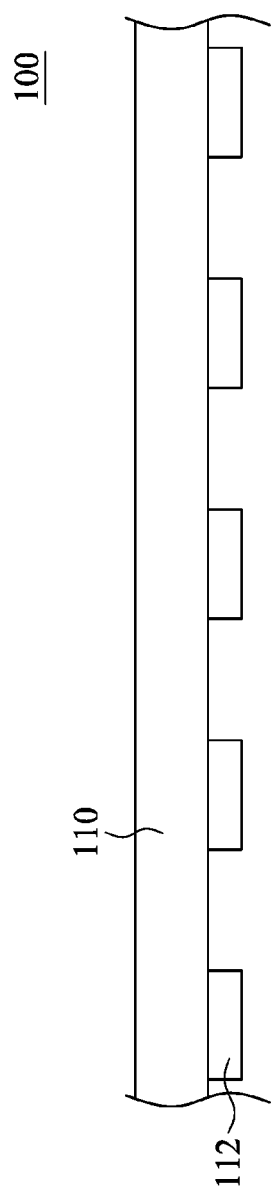
Figure 3:
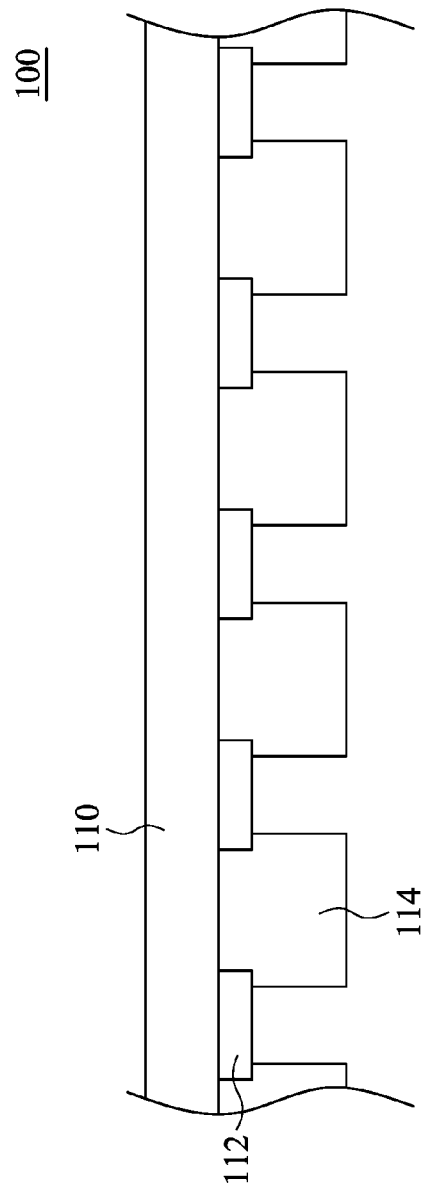
Figure 4:
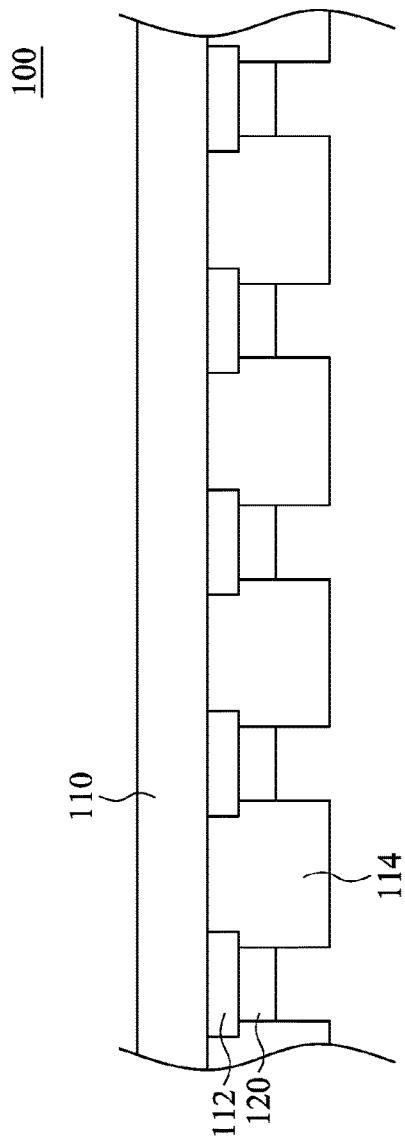

FIG. 2 to FIG. 8A are sectional side views of the touch sensing display apparatus 100 in different stages of a method 1100 for fabricating a touch sensing display apparatus according to multiple implementation manners of the present invention. As shown in FIG. 2, a color filter substrate 110 including a light-blocking layer 112 is provided. As shown in FIG. 3, a color filter 114 is formed on a surface of the color filter substrate 110 including the light-blocking layer 112, and is at least partial located at an aperture in the light-blocking layer 112. As shown in FIG. 4, the first touch sensing layer 120 is formed in the color filter 114. In other words, the first touch sensing layer 120 may be formed on a surface of the light-blocking layer 112 away from the color filter substrate 110, to reduce or avoid a decrease in an aperture ratio or a transmittance of the color filter substrate 110 that occurs because the color filter 114 is shielded or affected by the first touch sensing layer 120.

Figure 5:
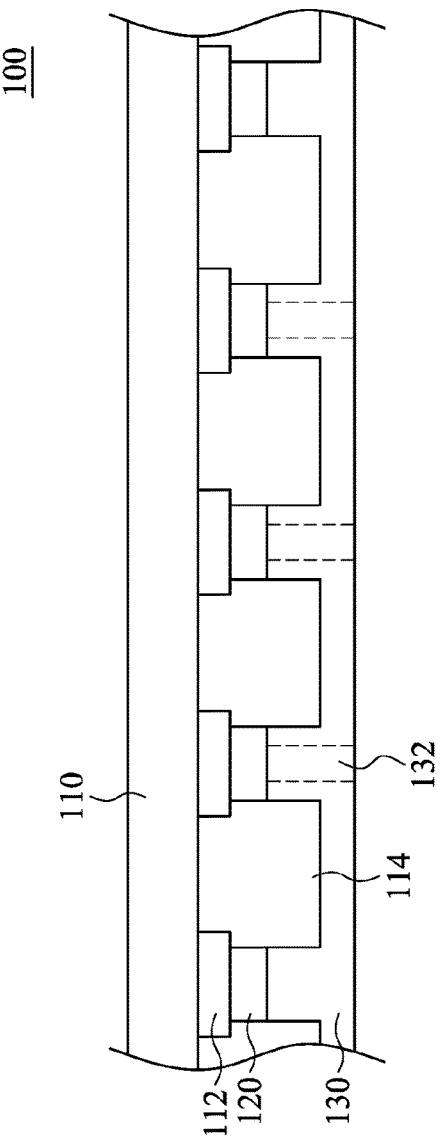

As shown in FIG. 5, an insulating layer 130 is formed on a side of a first touch sensing layer 120 away from the light-blocking layer 112. In multiple implementation manners, the insulating layer 130 may further include a plurality of first conductive structures 132. The first conductive structures 132 are formed in the insulating layer 130, and are electrically connected to a corresponding part of the first touch sensing layer 120. For example, the first conductive structures 132 are electrically connected to a sensing electrode. For example, the first conductive structures 132 is electrically connected to a drive electrode. In other multiple implementation manners, the material of the insulating layer 130 may only include an insulating material, which is described below in detail.

Figure 6:
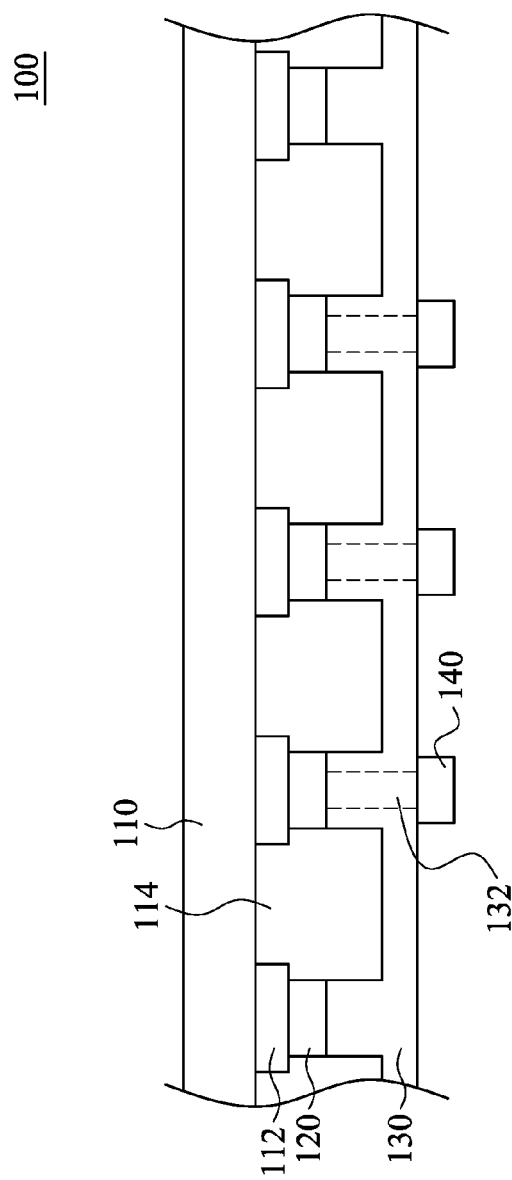

As shown in FIG. 6, a second touch sensing layer 140 is formed on a side of the insulating layer 130 away from the first touch sensing layer 120. In multiple implementation manners, the second touch sensing layer 140 may be electrically connected to the first touch sensing layer 120 through the first conductive structures 132.

Figure 7:
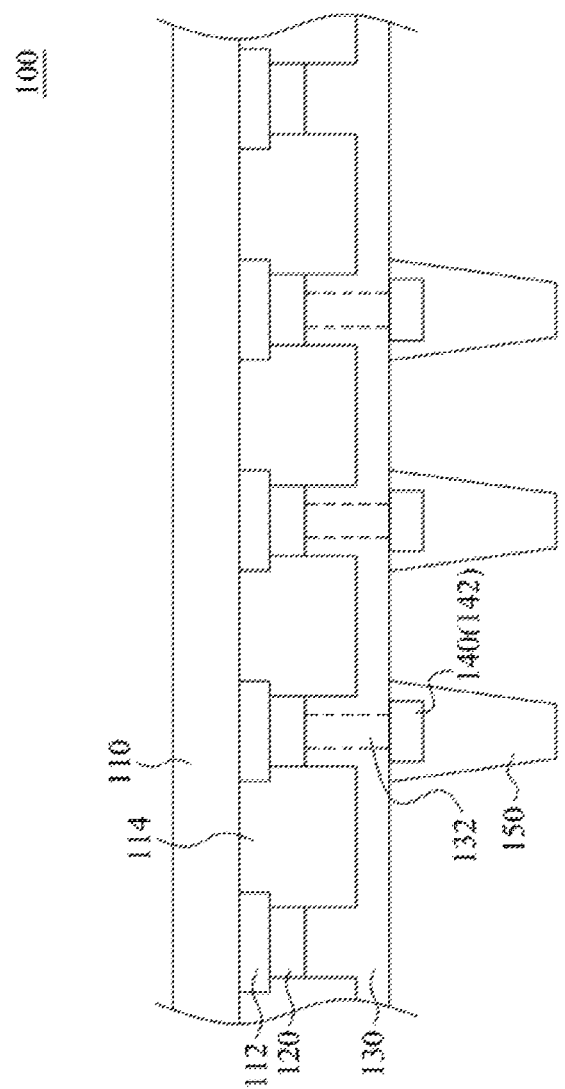

As shown in FIG. 7, a photo spacer 150 is formed on a side of the insulating layer 130 away from the light-blocking layer 112, and the photo spacer 150 substantially at least covers the second touch sensing layer 140, to prevent a surface of the second touch sensing layer 140 that is not adjacent to the insulating layer 130 from being exposed from the photo spacer 150. That is, the photo spacer 150 or the photo spacer 150 and the insulating layer 130 cover the second touch sensing layer 140, to implement insulation from the first touch sensing layer 120 and a liquid crystal layer 170.

As shown in FIG. 8A, a TFT substrate 160 is disposed on a side of the photo spacer 150 away from the insulating layer 130. In multiple implementation manners, two ends of the photo spacer 150 are respectively connected between the insulating layer 130 and the TFT substrate 160, and a space is supported and formed between the insulating layer 130 and the TFT substrate 160 for injection of liquid crystal 172 to form the liquid crystal layer 170. In multiple implementation manners, after the TFT substrate 160 and the photo spacer 150 are connected, the liquid crystal 172 may form the liquid crystal layer 170 between the insulating layer 130 and the TFT substrate 160 by using a process such as injection or one drop filling (ODF), and a rotation direction of the liquid crystal 172 in the liquid crystal layer 170 may be controlled by using the TFT substrate 160.

In multiple implementation manners, when the second touch sensing layer 140 is disposed, the second touch sensing layer 140 may be located inside a perpendicular projection of the light-blocking layer 112 in a stacking direction A of the light-blocking layer 112 and the insulating layer 130, so as to mitigate or avoid influence on optical quality from imaging of the touch sensing display apparatus 100, the transmittance or the aperture ratio of the color filter substrate 110, and the like, thereby improving an optical effect of the touch sensing display apparatus 100. In multiple implementation manners, when the photo spacer 150 is disposed, at least a part of the photo spacer 150 may be located inside the perpendicular projection of the light-blocking layer 112 in the stacking direction A of the light-blocking layer 112 and the insulating layer 130, so that similarly, influence on optical quality from imaging of the touch sensing display apparatus 100, the transmittance or the aperture ratio of the color filter substrate 110, and the like is avoided.

FIG. 8B is a sectional side view along a line segment B-B' in FIG. 8A. As shown in FIG. 8B, in multiple implementation manners, the second touch sensing layer 140 may be respectively connected in a spaced manner between corresponding adjacent two of the first conductive structures 132. For example, referring to FIG. 13, when a first touch sensing layer 120A and a first touch sensing layer 120B that extend in different directions meet, the first touch sensing layer 120B may be connected to a second conductive structure 142 of the second touch sensing layer 140 via the first conductive structures 132, and is then electrically connected to another first touch sensing layer 120B through another corresponding adjacent first conductive structure 132 connected to the second conductive structure, so that the first touch sensing layer 120B may be electrically connected to the another first touch sensing layer 120B over the first touch sensing layer 120A, and electric signals transferred on the first touch sensing layer 120A and the first touch sensing layer 120B can be prevented from affecting each other.

Figure 9:
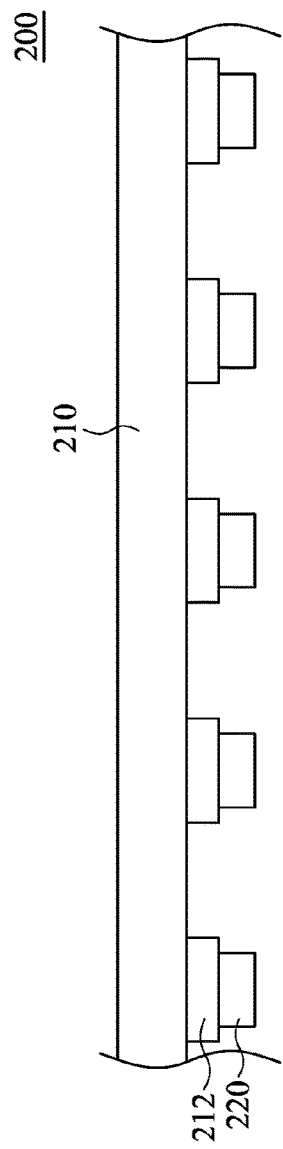
FIG. 9 and FIG. 10 are sectional side views of a touch sensing display apparatus in different stages of a method for fabricating a touch sensing display apparatus according to other multiple implementation manners of the present invention.
Figure 10:
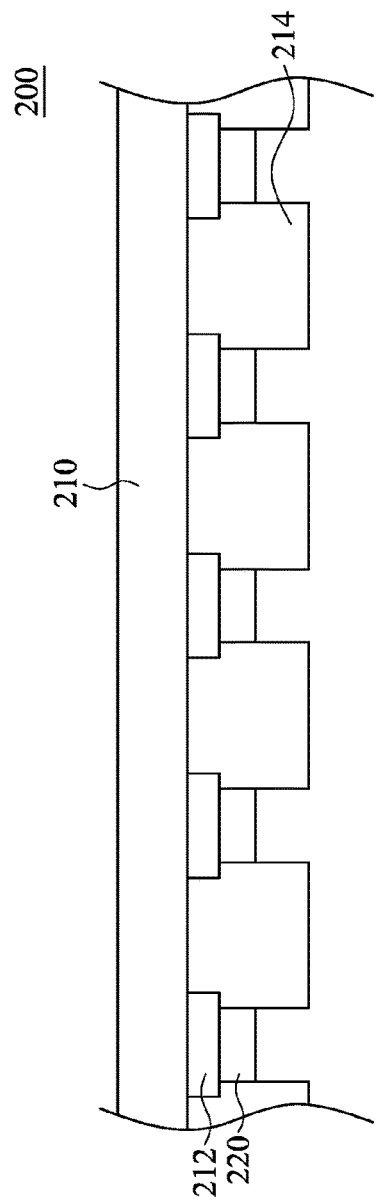

FIG. 9 and FIG. 10 are sectional side views of a touch sensing display apparatus 200 in different stages of a method 1100 for fabricating a touch sensing display apparatus according to other multiple implementation manners of the present invention. As shown in FIG. 9, a first touch sensing layer 220 is formed on a surface of a light-blocking layer 212 away from a color filter substrate 210, prior to the formation of a color filter 214. As shown in FIG. 10, the color filter 214 is formed on a surface of the color filter substrate 210 including the light-blocking layer 212, and is at least partially located between an aperture in the light-blocking layer 212 and the first touch sensing layer 220. In such an embodiment, a decrease in an aperture ratio or a transmittance of the color filter substrate 210 that occurs because the first touch sensing layer 220 shields or affects the color filter 214 can be desirably reduced or avoided.

Figure 11:
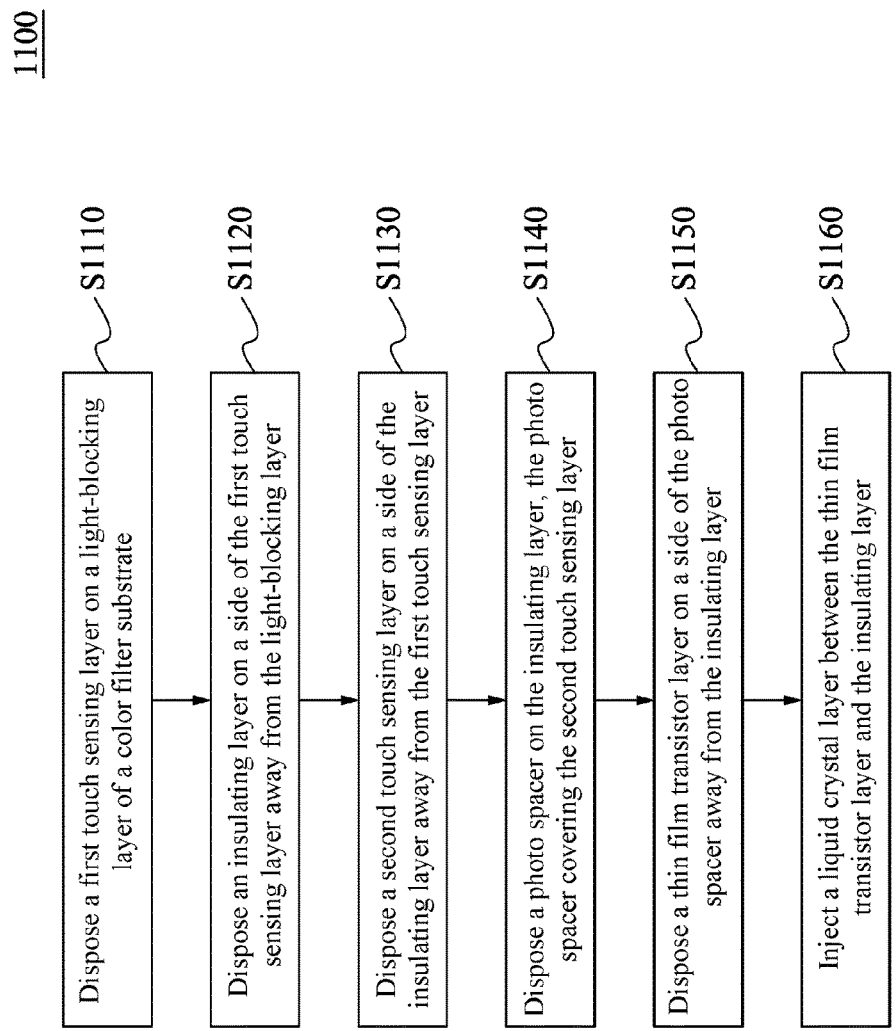
FIG. 11 is a brief flowchart of a method for fabricating a touch sensing display apparatus according to multiple implementation manners of the present invention.

FIG. 11 is a brief flowchart of a method 1100 for fabricating a touch sensing display apparatus according to multiple implementation manners of the present invention. As shown in FIG. 11, the method 1100 for fabricating a touch sensing display apparatus includes Step S1110 to Step S1160. Step S1110: Dispose a first touch sensing layer on a light-blocking layer of a color filter substrate including the light-blocking layer. Step S1120: Dispose an insulating layer on a side of the first touch sensing layer away from the light-blocking layer. Step S1130: Dispose a second touch sensing layer on a side of the insulating layer away from the first touch sensing layer. Step S1140: Dispose a photo spacer on a side of the insulating layer away from the light-blocking layer, the photo spacer covering the second touch sensing layer. Step S1150: Dispose a TFT substrate a side of the photo spacer away from the insulating layer. Step S1160: Inject liquid crystal between the insulating layer and the TFT substrate, to form a liquid crystal layer.

In multiple implementation manners, as shown in FIG. 5, the method 1100 for fabricating a touch sensing display apparatus may further include forming at least one first conductive structure in the insulating layer. The first conductive structure is electrically connected to the first touch sensing layer and the second touch sensing layer, respectively.

In multiple implementation manners, Step S1130 of disposing the second touch sensing layer may include disposing the second touch sensing layer to be located inside a perpendicular projection of the light-blocking layer in a stacking direction of the light-blocking layer and the insulating layer, so as to avoid influence on imaging of the touch sensing display apparatus and a transmittance or an aperture ratio of the color filter substrate.

In multiple implementation manners, Step S1140 of disposing the photo spacer may include disposing the photo spacer to be at least partially inside a perpendicular projection of the light-blocking layer in a stacking direction of the light-blocking layer and the insulating layer, so as to avoid influence on imaging of the touch sensing display apparatus and a transmittance or an aperture ratio of the color filter substrate.

Figure 12:
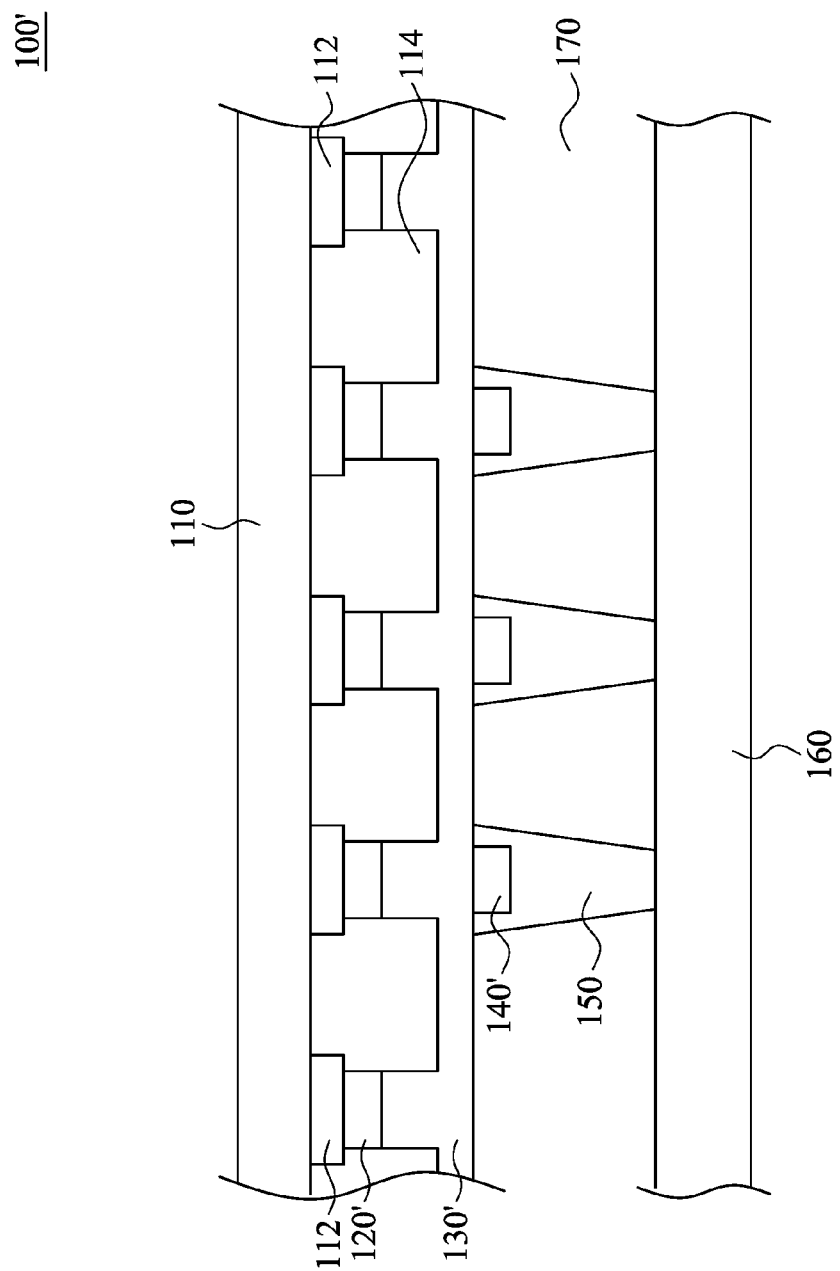
FIG. 12 is a sectional side view of a touch sensing display apparatus according to other multiple implementation manners of the present invention.

FIG. 12 is a sectional side view of a touch sensing display apparatus 100' according to other multiple implementation manners of the present invention. The touch sensing display apparatus 100' includes a color filter substrate 110, a first touch sensing layer 120', an insulating layer 130', a second touch sensing layer 140', a plurality of photo spacers 150, a TFT substrate 160, and a liquid crystal layer 170. In multiple implementation manners, the insulating layer 130' is disposed on a side of the color filter substrate 110 disposing with the first touch sensing layer 120'. The first touch sensing layer 120' is located between the insulating layer 130' and a light-blocking layer 112. The second touch sensing layer 140' is disposed on a side of the insulating layer 130' away from the first touch sensing layer 120'. In multiple implementation manners, the insulating layer 130' may prevent an electrical connection between the first touch sensing layer 120' and the second touch sensing layer 140'. That is, as compared with the touch sensing display apparatus 100, the first touch sensing layer 120' and the second touch sensing layer 140' of the touch sensing display apparatus 100' are separated into two independent touch sensing layers by using the insulating layer 130'. That is, in other multiple implementation manners, the first touch sensing layer 120' and the second touch sensing layer 140' of the touch sensing display apparatus 100' may also be a mutual type touch sensing module.

In multiple implementation manners, the plurality of photo spacers 150 is disposed on a side of the insulating layer 130' away from the first touch sensing layer 120', and covers the second touch sensing layer 140'. The TFT substrate 160 is disposed on a side of the photo spacers 150 away from the insulating layer 130'. The liquid crystal layer 170 is disposed between the insulating layer 130' and the TFT substrate 160. In addition, the side of the photo spacers 150 away from the insulating layer 130' is held against the TFT substrate 160. In other words, a side of the photo spacers 150 may be held against an electrode pattern (not shown) of the TFT substrate 160.

The photo spacers 150 of the touch sensing display apparatus 100' can support a space between the insulating layer 130' and the TFT substrate 160 for injection of the liquid crystal layer 170 to form a liquid crystal module and at the same time can insulate the second touch sensing layer 140' and the liquid crystal layer 170. Therefore, when the photo spacers 150 are used to cover the second touch sensing layer 140', the influence on liquid crystal in the liquid crystal layer 170 from an electric field generated by the second touch sensing layer 140' when an electric signal passes through the second touch sensing layer 140' may be mitigated or avoided. For example, an inclined angle of liquid crystal, the sensitivity of rotation, and the like are affected. Therefore, when an electric signal is transmitted between the first touch sensing layer 120' and the second touch sensing layer 140', the touch sensing display apparatus 100' may normally control the liquid crystal layer 170. Further, the touch sensing display apparatus 100' in which the insulating layer is omitted and the photo spacers 150 are used in place to cover the second touch sensing layer 140' may insulate the second touch sensing layer 140' and the liquid crystal layer 170 and at the same time support a space for the liquid crystal layer 170. In this way, the photo spacers 150 are used in place of the insulating layer to cover the second touch sensing layer 140', so that the thickness and weight of the touch sensing display apparatus 100' can be reduced, and functions of touch sensing and image displaying of the touch sensing display apparatus 100' are maintained, thereby further making the touch sensing display apparatus 100' lightweight and thin.

In addition, because the insulating layer 130' of the touch sensing display apparatus 100' prevents an electrical connection between the first touch sensing layer 120' and the second touch sensing layer 140', the first touch sensing layer 120' and the second touch sensing layer 140' may be respectively transferred on the layers. Therefore, the insulating layer 130' may reduce or mitigate mutual interference of electric signals between the first touch sensing layer 120' and the second touch sensing layer 140'. For example, an interference phenomenon such as cross-talk (cross-talk) occurs less often. Meanwhile, the first touch sensing layer 120' does not need to transfer an electric signal of sensing over the insulating layer 130' and the second touch sensing layer 140'. In this way, the length of a path on which an electric signal of the first touch sensing layer 120' is transferred is reduced, and the sensitivity of the first touch sensing layer 120' and the second touch sensing layer 140' in the touch sensing display apparatus 100' is further improved.

In multiple implementation manners, the first touch sensing layer 120' may include a plurality of drive electrodes, and the second touch sensing layer 140' may include a plurality of sensing electrodes. In other multiple implementation manners, the first touch sensing layer 120 may include the plurality of sensing electrodes, and the second touch sensing layer 140 may include the plurality of drive electrodes. Therefore, when a user touches the touch sensing display apparatus 200, the touch sensing display apparatus 200 may send a corresponding electric signal from a drive electrode of the first touch sensing layer 120 or the second touch sensing layer 140 respectively, and the corresponding electric signal is separately received by a sensing electrode of another touch sensing layer and is transmitted to a control module of the touch sensing display apparatus 200, to enable the touch sensing display apparatus 200 to sense a position of contact of the user.

Figure 14:
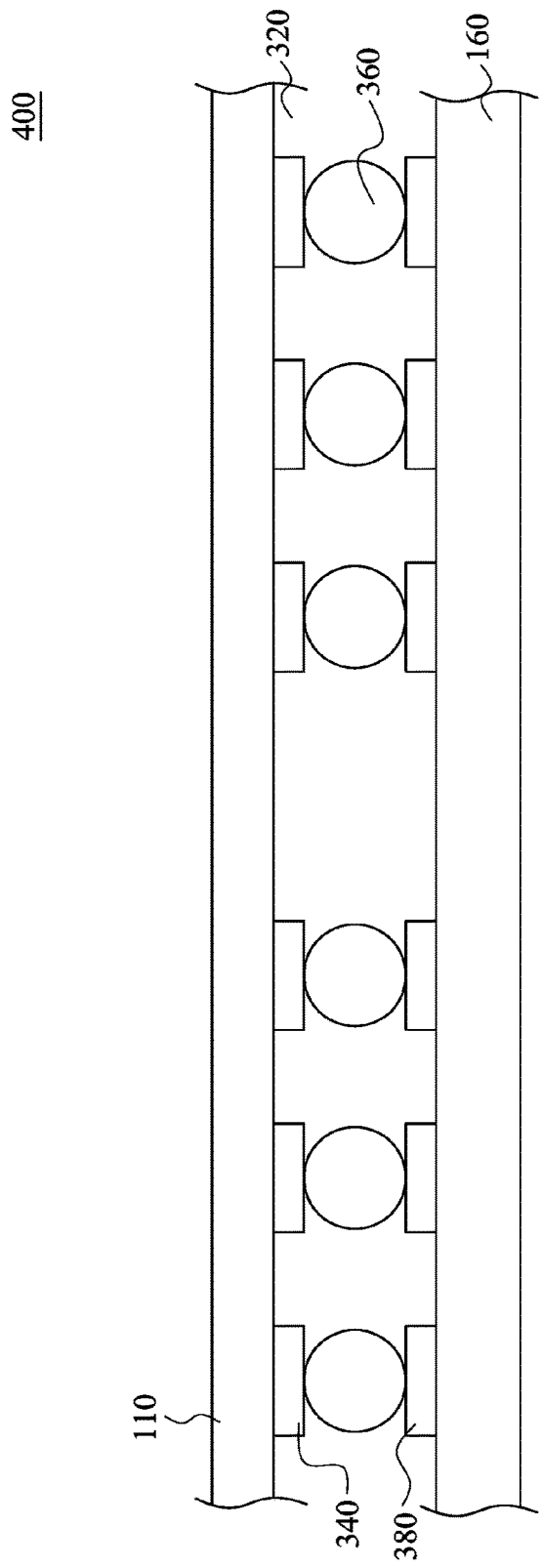
FIG. 14 is a sectional side view of the touch sensing display apparatus along a line segment C-C' in FIG. 13 according to multiple implementation manners of the present invention.

FIG. 13 is a perspective top view of a touch sensing display apparatus 300 according to multiple implementation manners of the present invention. FIG. 14 shows a touch sensing display apparatus 400 according to multiple implementation manners of the present invention. The touch sensing display apparatus 400 may be a sectional side view along a line segment C-C' of a sealant layer 320 in FIG. 13. As shown in FIG. 13, in multiple implementation manners, the touch sensing display apparatus 300 may further include the sealant layer 320 and at least one third conductive structure 360. In multiple implementation manners, the sealant layer 320 and the third conductive structure 360 may be disposed between the insulating layer 130 and the TFT substrate 160 in FIG. 1 or FIG. 12. In multiple implementation manners, the sealant layer 320 may be located at an edge area of the touch sensing display apparatus 300. In multiple implementation manners, the third conductive structure 360 is disposed inside the sealant layer 320, and electrically connects a first touch sensing layer 120 and the third conductive structure 360 by using a wire 340, and the first touch sensing layer 120 is then electrically connected to a surface of the TFT substrate 160 away from a liquid crystal layer 170 through the third conductive structure 360. In multiple implementation manners, at a dotted line shown in FIG. 13, a second touch sensing layer 140 is disposed to be electrically connected to at least one of a sensing electrode and a drive electrode of the first touch sensing layer 120 through a first conductive structure 132, so as to prevent the sensing electrode and the drive electrode of the first touch sensing layer 120 from contacting and failing to work. For example, reference may be made to the touch sensing display apparatus 100 shown in FIG. 1. In this implementation manner, the first touch sensing layer 120 is already electrically connected to the second touch sensing layer 140, and therefore, in the touch sensing display apparatus 300, only the first touch sensing layer 120 needs to be electrically connected to a surface of the TFT substrate 160 away from the liquid crystal layer 170 through the third conductive structure 360; however, the present invention is not limited thereto.

As shown in FIG. 14, in multiple implementation manners, the touch sensing display apparatus 400 may include a color filter substrate 110, the sealant layer 320, the wire 340, the third conductive structure 360, and the TFT substrate 160. In multiple implementation manners, the wire 340 is disposed on a surface of the color filter substrate 110 toward the TFT substrate 160. The third conductive structure 360 is disposed in the sealant layer 320, and is electrically connected to the wire 340. In multiple implementation manners, the third conductive structure 360 may be a metal mall or another suitable conductive material. The TFT substrate 160 may further include a fourth conductive structure 380, disposed on a surface of the TFT substrate 160 toward the color filter substrate 110, and electrically connected to the third conductive structure 360. In this way, the first touch sensing layer 120 may be electrically connected to the fourth conductive structure 380 through the wire 340 and the third conductive structure 360. Further, a conductive feature electrically connected to the first touch sensing layer 120 may be guided to the surface of the TFT substrate 160 away from the liquid crystal layer 170 through the fourth conductive structure 380.

Figure 15:
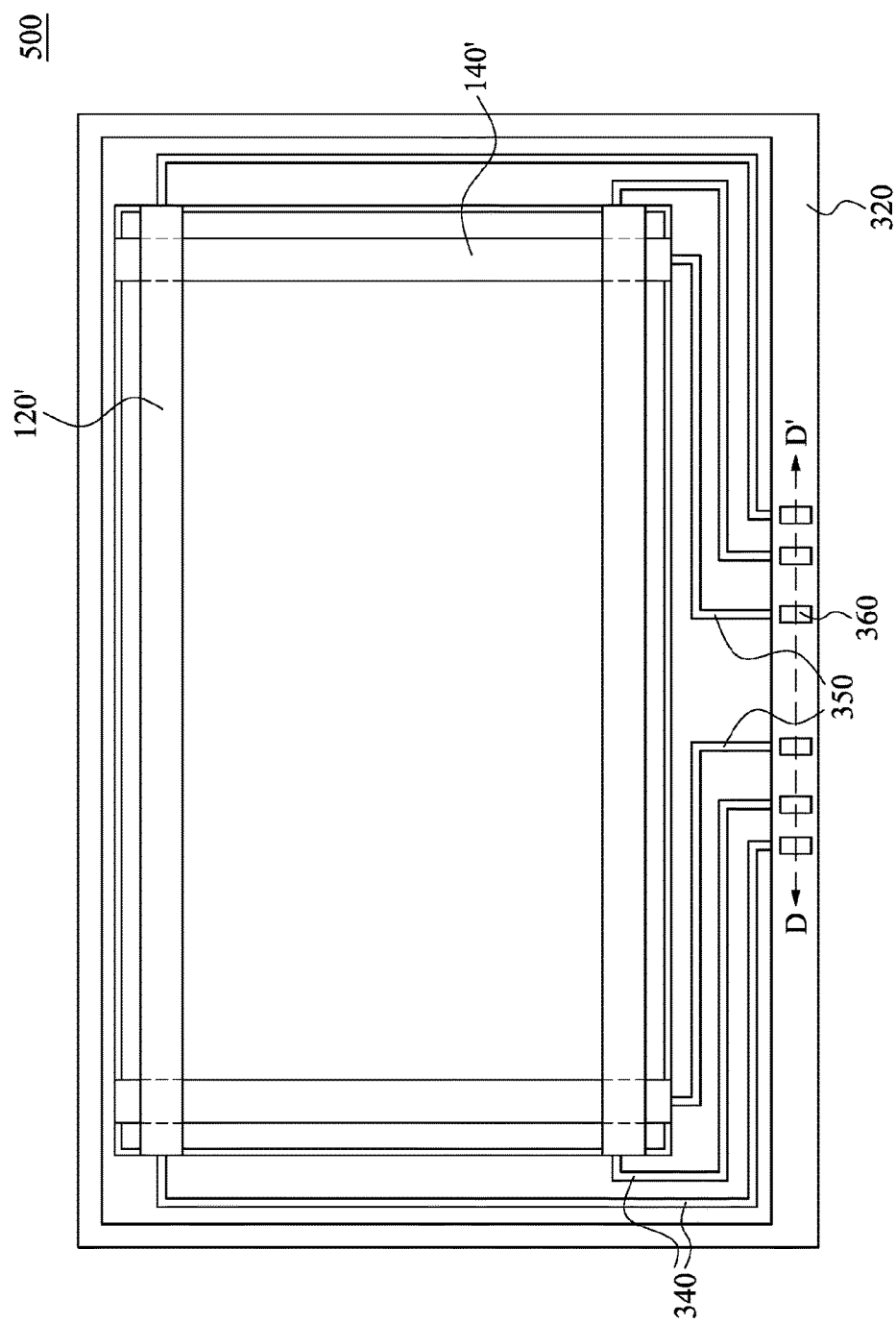
FIG. 15 is a perspective top view of a touch sensing display apparatus according to other multiple implementation manners of the present invention.
Figure 16:
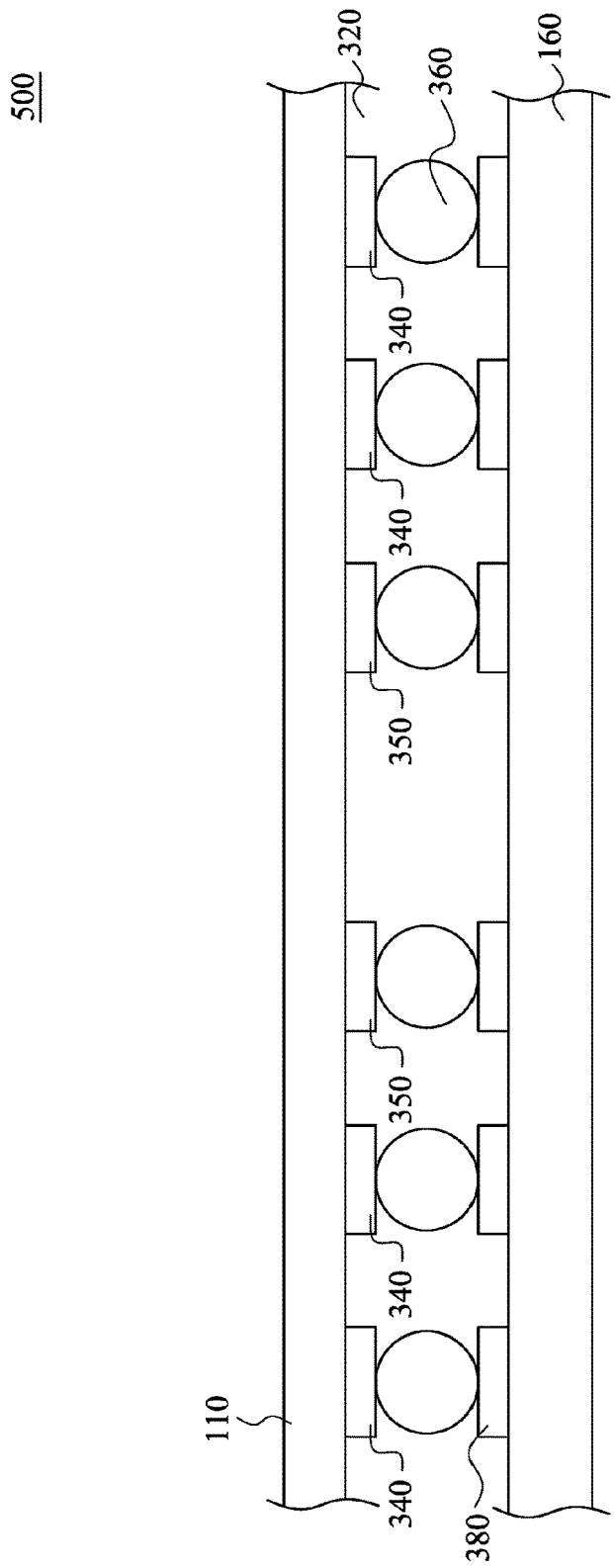
FIG. 16 is a sectional side view of the touch sensing display apparatus along a line segment D-D' in FIG. 15 according to other multiple implementation manners of the present invention.

FIG. 15 is a perspective top view of a touch sensing display apparatus 500 according to other multiple implementation manners of the present invention. FIG. 16 is a sectional side view along a line segment D-D' at a sealant layer 320 in FIG. 15 of the touch sensing display apparatus 500 according to other multiple implementation manners of the present invention. As shown in FIG. 15, in other multiple implementation manners, areas defined by dotted lines shown in FIG. 15 represent that a first touch sensing layer 120' and a second touch sensing layer 140' respectively pass here on two sides of an insulating layer 130' and are stacked on each other; however, the insulating layer 130' may separate and insulate the first touch sensing layer 120' and the second touch sensing layer 140' (referring to the touch sensing display apparatus 100' shown in FIG. 12). Therefore, in multiple implementation manners, a wire 340 and a wire 350 of the touch sensing display apparatus 500 may be used as leads to electrically connect the first touch sensing layer 120' and the second touch sensing layer 140' to a third conductive structure 360, respectively, and the second touch sensing layer 140' and the first touch sensing layer 120' may be further electrically connected to a surface of a TFT substrate 160 away from a liquid crystal layer 170 through the third conductive structure 360. Even, in some implementation manners, the third conductive structure 360 may also be electrically connected to the first touch sensing layer 120' and the second touch sensing layer 140'.

As shown in FIG. 16, in other multiple implementation manners, the touch sensing display apparatus 500 may include a color filter substrate 110, the sealant layer 320, the wire 340, the wire 350, the third conductive structure 360, and the TFT substrate 160. In multiple implementation manners, the wire 340 and the wire 350 are disposed on a surface of the color filter substrate 110 toward the TFT substrate 160. The third conductive structure 360 is disposed in the sealant layer 320, and is electrically connected to the wire 340 and the wire 350. The TFT substrate 160 may further include a fourth conductive structure 380, disposed on a surface of the TFT substrate 160 toward the color filter substrate 110, and is electrically connected to the third conductive structure 360. In this way, the first touch sensing layer 120' may be electrically connected, through the wire 340, and the second touch sensing layer 140' may be electrically connected, through the wire 350, to the third conductive structure 360 and the fourth conductive structure 380. Further, a conductive feature electrically connected to the first touch sensing layer 120' and the second touch sensing layer 140' may be guided to the surface of the TFT substrate 160 away from the liquid crystal layer 170 through the fourth conductive structure 380.

In conclusion, in the touch sensing display apparatus provided in the present invention, a photo spacer is used to cover a touch sensing layer that is disposed on an insulating layer and near a surface of a liquid crystal layer, to isolate or insulate an electric field of the touch sensing layer from affecting the liquid crystal layer, so that liquid crystal molecules inside the liquid crystal layer may receive an electric signal of a TFT substrate without being subject to too much interference, to enable the touch sensing display apparatus to implement normal imaging, and at the same time reduce the thickness and weight of the touch sensing display apparatus. In this way, the influence on the liquid crystal layer in the touch sensing display apparatus from the electric field generated by the touch sensing layer can be reduced or avoided, and the touch sensing display apparatus further becomes lightweight and thin.

Although the present invention has been disclosed above by using the implementation manners, the implementation manners are not used to limit the present invention. Any person skilled in the art may make various variations and modifications without departing from the spirit and scope of the present invention, and therefore the protection scope of the present invention should be as defined by the appended claims.

What is claimed is:
1. A touch sensing display apparatus, comprising:
   a color filter substrate, comprising a light-blocking layer;
   a first touch sensing layer, disposed on the light-blocking layer;
   an insulating layer, disposed on the color filter substrate and the first touch sensing layer, wherein the first touch sensing layer is located between the insulating layer and the light-blocking layer;
   a second touch sensing layer, disposed on the insulating layer, wherein the insulating layer is located between the first touch sensing layer and the second touch sensing layer;
   a plurality of photo spacers, disposed on the insulating layer and covering the second touch sensing layer;

a thin film transistor (TFT) substrate, disposed on the photo spacers;
a liquid crystal layer, disposed between the insulating layer and the TFT substrate; and
at least one first conductive structure, disposed in the insulating layer, and the second touch sensing layer being electrically connected to the first touch sensing layer through the first conductive structure.

2. The touch sensing display apparatus according to claim 1, wherein the touch sensing display apparatus comprises a plurality of first conductive structures, the first touch sensing layer comprises a plurality of drive electrodes and a plurality of sensing electrodes, and a corresponding drive electrode are respectively electrically connected to the second touch sensing layer through a corresponding first conductive structures.

3. The touch sensing display apparatus according to claim 1, wherein the touch sensing display apparatus comprises a plurality of first conductive structures, the first touch sensing layer comprises a plurality of drive electrodes and a plurality of sensing electrodes, and a corresponding sensing electrode is respectively electrically connected to the second touch sensing layer through a corresponding first conductive structures.

4. The touch sensing display apparatus according to claim 1, wherein the touch sensing display apparatus comprises a plurality of first conductive structures, and the second touch sensing layer comprises a plurality of second conductive structures, respectively connected in a spaced manner between corresponding adjacent two of the first conductive structures.

5. The touch sensing display apparatus according to claim 1, wherein the liquid crystal layer is negative liquid crystal.

6. The touch sensing display apparatus according to claim 1, wherein the second touch sensing layer is located inside a perpendicular projection of the light-blocking layer in a stacking direction of the light-blocking layer and the insulating layer.

7. The touch sensing display apparatus according to claim 1, wherein the photo spacers are disposed in the liquid crystal layer, and the photo spacers are at least partially located inside a perpendicular projection of the light-blocking layer in a stacking direction of the light-blocking layer and the insulating layer.

8. The touch sensing display apparatus according to claim 1, further comprising a sealant layer and a third conductive structure, the sealant layer and the third conductive structure are located between the insulating layer and the TFT substrate, the third conductive structure is disposed inside the sealant layer, and electrically connecting the first touch sensing layer to the TFT substrate.

9. The touch sensing display apparatus according to claim 8, wherein the third conductive structure electrically connects the second touch sensing layer and the first touch sensing layer.

10. A method for fabricating a touch sensing display apparatus, comprising:
disposing a first touch sensing layer on a light-blocking layer of a color filter substrate;
disposing an insulating layer on the first touch sensing layer;
disposing a second touch sensing layer on the insulating layer;
disposing a photo spacer on the insulating layer and covering the second touch sensing layer;
disposing a thin film transistor (TFT) substrate on the photo spacer; and
forming at least one first conductive structure in the insulating layer, the at least one first conductive structure being electrically connected to the first touch sensing layer and the second touch sensing layer, respectively.

11. The method for fabricating the touch sensing display apparatus according to claim 10, further comprising:
injecting a liquid crystal layer between the insulating layer and the TFT substrate.

12. The method for fabricating the touch sensing display apparatus according to claim 10, wherein the disposing the second touch sensing layer further comprises:
enabling the second touch sensing layer to be located inside a perpendicular projection of the light-blocking layer in a stacking direction of the light-blocking layer and the insulating layer.

13. The method for fabricating the touch sensing display apparatus according to claim 10, wherein the disposing the photo spacer further comprises:
enabling the photo spacer to be at least partially located inside a perpendicular projection of the light-blocking layer in a stacking direction of the light-blocking layer and the insulating layer.

14. A touch sensing display apparatus, comprising:
a color filter substrate, comprising a light-blocking layer;
a first touch sensing layer, disposed on the light-blocking layer;
an insulating layer, disposed on the color filter substrate and the first touch sensing layer, wherein the first touch sensing layer is located between the insulating layer and the light-blocking layer;
a second touch sensing layer, disposed on the insulating layer, wherein the insulating layer is located between the first touch sensing layer and the second touch sensing layer;
a plurality of photo spacers, disposed on the insulating layer and covering the second touch sensing layer;
a thin film transistor (TFT) substrate, disposed on the photo spacers;
a liquid crystal layer, disposed between the insulating layer and the TFT substrate;
a sealant layer; and
a third conductive structure, wherein the sealant layer and the third conductive structure are located between the insulating layer and the TFT substrate, the third conductive structure is disposed inside the sealant layer, electrically connecting the first touch sensing layer to the TFT substrate, and the third conductive structure electrically connects the second touch sensing layer and the first touch sensing layer.

* * * * *